(12) United States Patent
Hu

(10) Patent No.: US 12,048,354 B2
(45) Date of Patent: Jul. 30, 2024

(54) ROPE ADJUSTING DEVICE AND ARTICLE HAVING ROPE ADJUSTING DEVICE

(71) Applicant: SHENZHEN FITGO TECHNOLOGY CO., LTD., Shenzhen (CN)

(72) Inventor: Kaiyan Hu, Shenzhen (CN)

(73) Assignee: SHENZHEN FITGO TECHNOLOGY CO., LTD., Shenzhen (CN)

(*) Notice: Subject to any disclaimer, the term of this patent is extended or adjusted under 35 U.S.C. 154(b) by 917 days.

(21) Appl. No.: 17/049,963

(22) PCT Filed: Dec. 14, 2018

(86) PCT No.: PCT/CN2018/121332
§ 371 (c)(1),
(2) Date: Oct. 23, 2020

(87) PCT Pub. No.: WO2020/103240
PCT Pub. Date: May 28, 2020

(65) Prior Publication Data
US 2021/0227937 A1 Jul. 29, 2021

(30) Foreign Application Priority Data
Nov. 20, 2018 (CN) .......................... 201811380427.3

(51) Int. Cl.
*A43C 11/16* (2006.01)
*A43C 7/08* (2006.01)
*F16G 11/14* (2006.01)

(52) U.S. Cl.
CPC .............. *A43C 7/08* (2013.01); *A43C 11/165* (2013.01); *F16G 11/146* (2013.01)

(58) Field of Classification Search
CPC ........... A43C 7/08; A43C 11/165; A43C 1/00; A43C 1/003; A43C 11/16; F16G 11/146
See application file for complete search history.

(56) References Cited

U.S. PATENT DOCUMENTS 5,157,813 A 10/1992 Carroll
10,842,230 B2 * 11/2020 Pollack .................... A43C 7/00
(Continued)

FOREIGN PATENT DOCUMENTS

| AT | 196751 B | * 11/1954 |
| CN | 1074357 C | 11/2001 |

(Continued)

OTHER PUBLICATIONS

International Search Report dated Aug. 19, 2019.

*Primary Examiner* — Jack W Lavinder
(74) *Attorney, Agent, or Firm* — Platinum Intellectual Property PC

(57) ABSTRACT

A rope adjusting device, including an adjusting piece, a mounting base, and a rope winder configured to wind a rope. The adjusting piece is rotatably connected to the mounting base. The adjusting piece includes a driving portion and a linking portion which are fixed with respect to each other and coaxially provided. A rotation limiting portion corresponding to the linking portion and configured to limit the rotating direction of the linking portion is provided on the mounting base. The rope winder is rotatably connected to the mounting base. A driven portion in transmission connection with the driving portion is provided on the rope winder. The rotating axis of the driving portion and the rotating axis of the driven portion are collinear. Also provided is an article having the rope adjusting device.

18 Claims, 10 Drawing Sheets

(56) References Cited

U.S. PATENT DOCUMENTS

| | | | |
|---|---|---|---|
| 10,874,175 B2 * | 12/2020 | So | A44B 11/065 |
| 2010/0251524 A1 | 10/2010 | Chen | |
| 2012/0023717 A1 | 2/2012 | Chen | |
| 2013/0014359 A1 | 1/2013 | Chen | |
| 2017/0303644 A1 | 10/2017 | Cavanagh et al. | |
| 2018/0317609 A1 | 11/2018 | Beers et al. | |
| 2018/0319617 A1 | 11/2018 | Kim | |

FOREIGN PATENT DOCUMENTS

| | | | |
|---|---|---|---|
| CN | 104822284 A | 8/2015 | |
| CN | 206675098 U | 11/2017 | |
| CN | 207322825 U | 5/2018 | |
| CN | 108354269 A | 8/2018 | |
| CN | 108451098 A | 8/2018 | |
| CN | 108738298 A | 11/2018 | |
| CN | 209067769 U | 7/2019 | |
| JP | 3162969 U | 9/2010 | |
| JP | 2018121890 A | 8/2018 | |
| KR | 20100009337 U | 9/2010 | |
| KR | 101607690 B1 | 3/2016 | |
| KR | 101651402 B1 | 8/2016 | |
| KR | 101833680 B1 | 2/2018 | |
| WO | 2018124827 A1 | 7/2018 | |
| WO | 2019075799 A1 | 4/2019 | |

* cited by examiner

ROPE ADJUSTING DEVICE AND ARTICLE HAVING ROPE ADJUSTING DEVICE

CROSS-REFERENCE TO RELATED APPLICATION

This application is a United States National Stage Application filed under 35 U.S.C 371 of PCT Patent Application Serial No. PCT/CN2018/121332, filed Dec. 14, 2018, which claims Chinese Patent Application Serial No. CN 201811380427.3, filed Nov. 20, 2018, the disclosure of all of which are hereby incorporated by reference in their entirety.

TECHNICAL FIELD

The present disclosure relates to the technical field of articles for daily use, in particular to a rope adjusting device and an article having the rope adjusting device.

BACKGROUND ART

Products such as shoes, clothes and medical protective gear are provided with ropes, and the purpose of fixing the products is achieved by adjusting tightness of the rope (or rope belt).

At present, one needs to pull two ends of the rope by two hands, respectively, to realize adjustment of tightness, and then fix the rope by knotting.

The knotting needs to be completed by two hands, and the tightness degree of knotting is hard to ensure. When going out, due to movement and other reasons, the rope may become loose, and at this moment, the rope needs to be knotted again.

The knotting is relatively time-consuming, and as to shoelace, only when one bends down, can the knotting operation be performed. However, once encountering a crowded situation, the operation of tying cannot be performed at all, which may cause drop-out of the shoe when the heelpiece is stepped on.

SUMMARY

The present disclosure aims at providing a rope adjusting device and an article having the rope adjusting device to overcome the defects in the prior art and solve the problems in the prior art.

In order to solve the above problems, the present disclosure provides a rope adjusting device, including an adjusting part, a mounting base and a rope winding part configured to be wound by a rope, wherein
  the adjusting part and the mounting base are rotatably connected, the adjusting part includes a driving portion and a linkage portion, which are relatively fixed and coaxially arranged;
  the mounting base is provided with a rotation restricting portion corresponding to the linkage portion and configured to restrict a rotational direction of the linkage portion, wherein the rotational direction of the linkage portion coincides with a direction of tightening the rope of the rope winding part; and
  the rope winding part is rotatably connected to the mounting base, the rope winding part is provided with a driven portion in transmission connection with the driving portion, and axes of rotation of both the driving portion and the driven portion are collinear.

As further improvement of the above technical solution, the adjusting part further includes a housing,
  wherein the driving portion and the linkage portion are both provided inside the housing.

As further improvement of the above technical solution, the housing, the driving portion and the linkage portion are integrally molded.

As further improvement of the above technical solution, the driving portion includes an outer gear ring, the linkage portion includes an inner ratchet ring, the driven portion includes an inner gear ring, and the rotation restricting portion includes a pawl,
  wherein the radius of addendum circle of the outer gear ring is smaller than the radius of addendum circle of the inner ratchet ring.

As further improvement of the above technical solution, the rope winding part is provided with an insertion part located on an axis of rotation of the driven portion, and the adjusting part is provided with an insertion hole configured to enable the insertion part to be mounted, wherein the insertion part and the driven portion are both located at a front side of the rope winding part; and
  the insertion part is inserted into and slidably connected to the insertion hole, and meanwhile, the insertion part is further rotatably connected to the insertion hole all the time,
  wherein the linkage portion is combined with or separated from the rotation restricting portion through relative sliding between the insertion part and the insertion hole.

As further improvement of the above technical solution, the insertion part includes several elastic plugs, wherein the plug are provided with a metal spring sheet configured to improve the strength.

As further improvement of the above technical solution, the mounting base is provided with a mounting hole configured to enable the rope winding part to be mounted, and the rope winding part is inserted into and rotatably connected with the mounting hole; and
  the mounting base is further provided with limiting buckles, and the limiting buckles are configured to limit a movement range of the rope winding part, so as to prevent the rope winding part from escaping from the mounting hole.

As further improvement of the above technical solution, a side wall of the mounting base is provided with several rope inlet holes in communication with the mounting hole;
  a side wall of the rope winding part is provided with a wiring groove configured to be wound by the rope, the wiring groove is provided therein with rope threading holes corresponding to the rope inlet holes one by one; and
  the rope threading holes are in communication with the mounting hole.

As further improvement of the above technical solution, exit holes in communication with the rope threading holes are provided inside the rope winding part, wherein a front end of the rope extends from the exit hole and is knotted, so as to restrict a movement range of the front end of the rope, so that the rope will not slide out from the rope threading holes.

The present disclosure further provides an article having the rope adjusting device, including the rope adjusting device according to any one of the above.

The present disclosure has following beneficial effects: the present disclosure provides a rope adjusting device, including the adjusting part, the mounting base and the rope winding part configured to be wound by a rope, wherein the mounting base may be mounted on articles such as shoes, and by rotating the adjusting part, the rope winding part is driven to rotate, so that the rope is tightened. The rope adjusting device has a simple structure and is easy and convenient to operate.

BRIEF DESCRIPTION OF DRAWINGS

In order to more clearly illustrate technical solutions of embodiments of the present disclosure, accompanying drawings which are needed for the embodiments will be introduced briefly below. It should be understood that the accompanying drawings below merely show some embodiments of the present disclosure, therefore, they should not be considered as limitation to the scope, and a person ordinarily skilled in the art still can obtain other relevant accompanying drawings according to these accompanying drawings, without inventive efforts.

Figure 1:
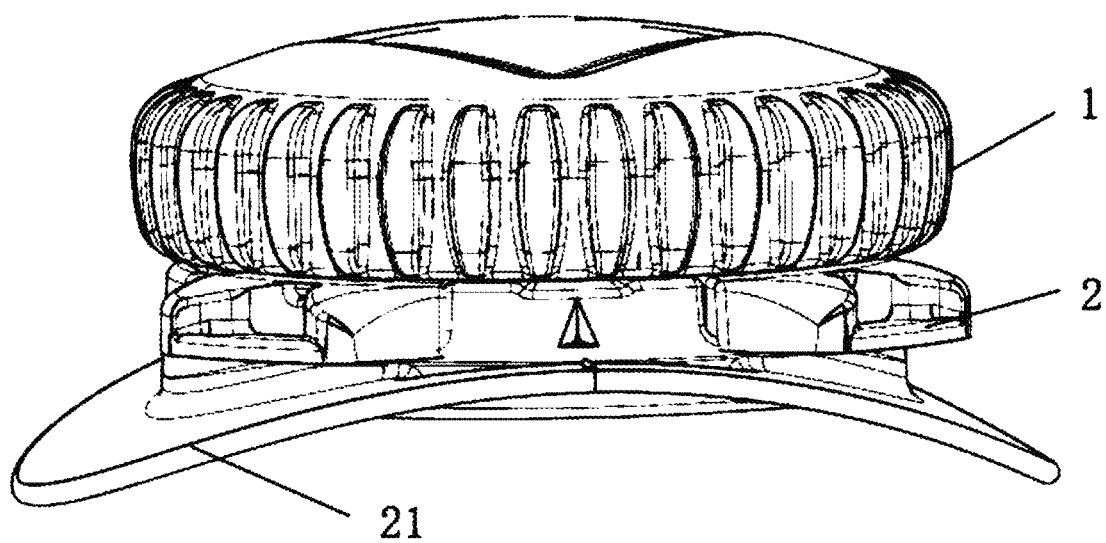
FIG. 1 is a schematic view of a rope adjusting device in an embodiment of the present disclosure.

Illustration of reference signs of main elements:
1-adjusting part; 2-mounting base; 3-rope winding part; 4-driving portion; 5-linkage portion; 6-rotation restricting portion; 7-driven portion; 8-housing; 9-housing cover; 10-buckle; 11-brim; 12-insertion part; 13-insertion hole; 14-plug; 15-metal spring sheet; 16-mounting hole; 17-rope inlet hole; 18-wiring groove; 19-rope threading hole; 20-exit hole; 21-sewing part; 22-limiting buckle; 23-disassembling groove.

DETAILED DESCRIPTION OF EMBODIMENTS

In the text below, various embodiments of the present disclosure will be described more comprehensively. The present disclosure may have various embodiments, and modifications and alterations may be made thereto. However, it should be understood that it is not intended to limit the various embodiments of the present disclosure to the specific embodiments disclosed herein, while the present disclosure should be construed as covering all modifications, equivalents and/or optional solutions falling within the spirit and scope of various embodiments of the present disclosure.

In the following, the term "include" or "may (can) include" which can be used in various embodiments of the present disclosure indicates the presence of the function, operation or element disclosed, but does not limit the addition of one or more functions, operations or elements. Besides, terms such as "include", "have" and cognates thereof used in various embodiments of the present disclosure are merely intended to indicate specific features, numbers, steps, operations, elements, components or combinations of the foregoing items, but should not be construed as initially excluding the presence of one or more other features, numbers, steps, operations, elements, components or combinations of the foregoing items, or the possibility of adding one or more features, numbers, steps, operations, elements, components or combinations of the foregoing items.

In various embodiments of the present disclosure, the expression "A or/and B" includes any combination or all combinations of the literally listed, for example, it may include A, it may include B, or it may include both A and B.

The expressions (such as "first" or "second") used in various embodiments of the present disclosure may modify various constituent elements in various embodiments, although the corresponding constituent elements may not be limited. For example, the above expressions do not limit the order and/or importance of the elements. The above expressions are merely for the purpose of distinguishing one element from the other elements. For example, a first user device and a second user device indicate different user devices, although both are user devices. For example, without departing from the scope of various embodiments of the present disclosure, a first element may be referred to as second element, and likewise, the second element may also be referred to as first element.

It should be noted that, in the present disclosure, unless otherwise specified and defined explicitly, the term such as "mount", "connect" or "fix" should be construed in a broad sense, and a connection may be direct connection, indirect connection via an intermediate medium, or internal communication between two elements. For those ordinarily skilled in the art, specific meanings of the above-mentioned terms in the present disclosure can be understood according to specific circumstances.

In the present disclosure, those ordinarily skilled in the art should understand that terms indicating orientation or positional relations herein are based on orientation or positional relations as shown in the accompanying drawings, merely for facilitating the description of the present disclosure and simplifying the description, rather than indicating or implying that related devices or elements have to be in the specific orientation, or configured or operated in a specific orientation, therefore, they should not be construed as limitation to the present disclosure.

The terms used in various embodiments of the present disclosure are merely for the purpose of describing specific embodiments, rather than limiting the various embodiments of the present disclosure. Unless otherwise defined, all terms (including technical terms and scientific terms) used herein have the same meanings as those generally understood by a person ordinarily skilled in the art of the various embodiments of the present disclosure. The terms (such as the terms defined in dictionaries commonly used) shall be construed as having the same meanings as those in the context of relevant technical field and shall not be construed as having ideal meanings or too formal meanings, unless clearly defined in various embodiments of the present disclosure.

Embodiment 1

Figure 2:
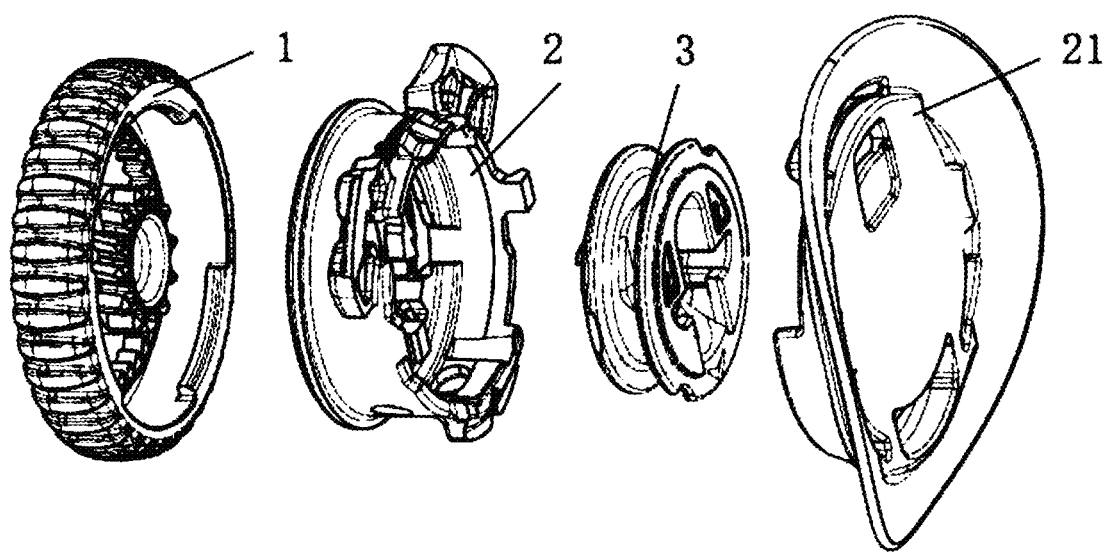
FIG. 2 is a schematic exploded view of a rope adjusting device in an embodiment of the present disclosure.

Referring to FIG. 1 and FIG. 2, in the present embodiment, a rope adjusting device is provided, including an adjusting part 1, a mounting base 2 and a rope winding part 3 configured to be wound by rope, wherein the adjusting part 1 and the mounting base 2 are rotatably connected.

Figure 3:
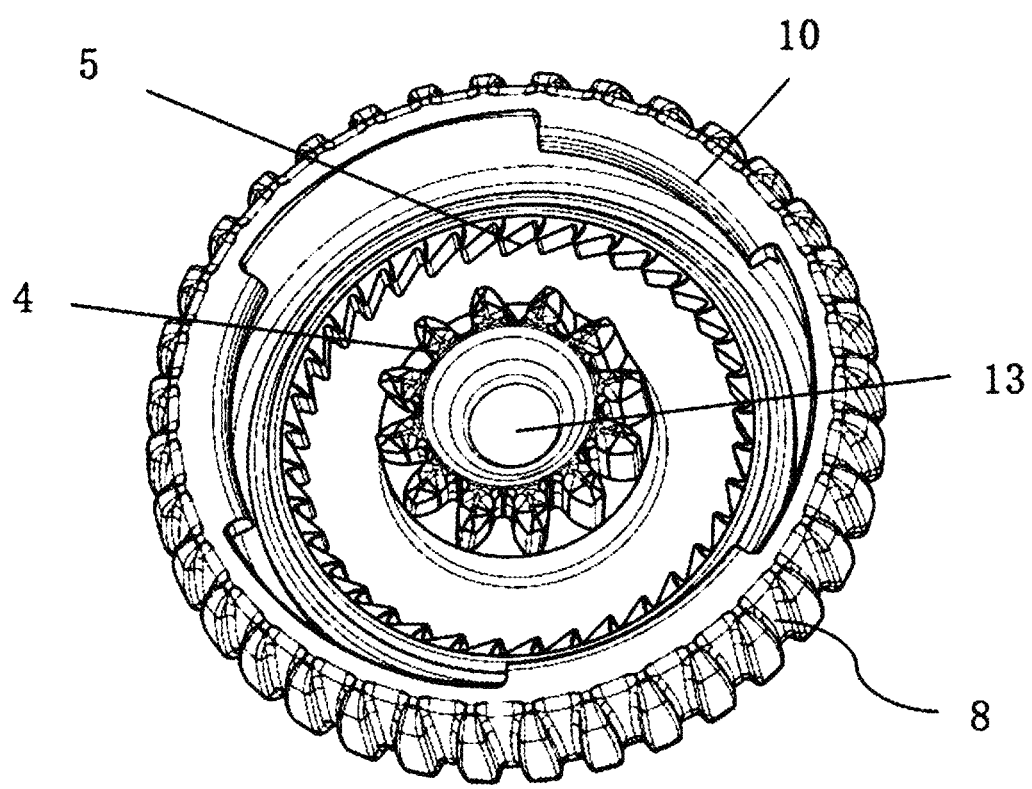
FIG. 3 is a schematic view of an adjusting part in an embodiment of the present disclosure.

As shown in FIG. 3, the adjusting part 1 includes a driving portion 4 and a linkage portion 5, which are relatively fixed and coaxially arranged.

As the driving portion 4 and the linkage portion 5 are relatively fixed, the linkage portion 5 will also be rotated synchronously when the driving portion 4 is rotated with the adjusting part 1. Moreover, as the adjusting part 1 can be rotated with respect to the mounting base 2, axes of rotation of both the driving portion 4 and the linkage portion 5 are also collinear.

Figure 5:
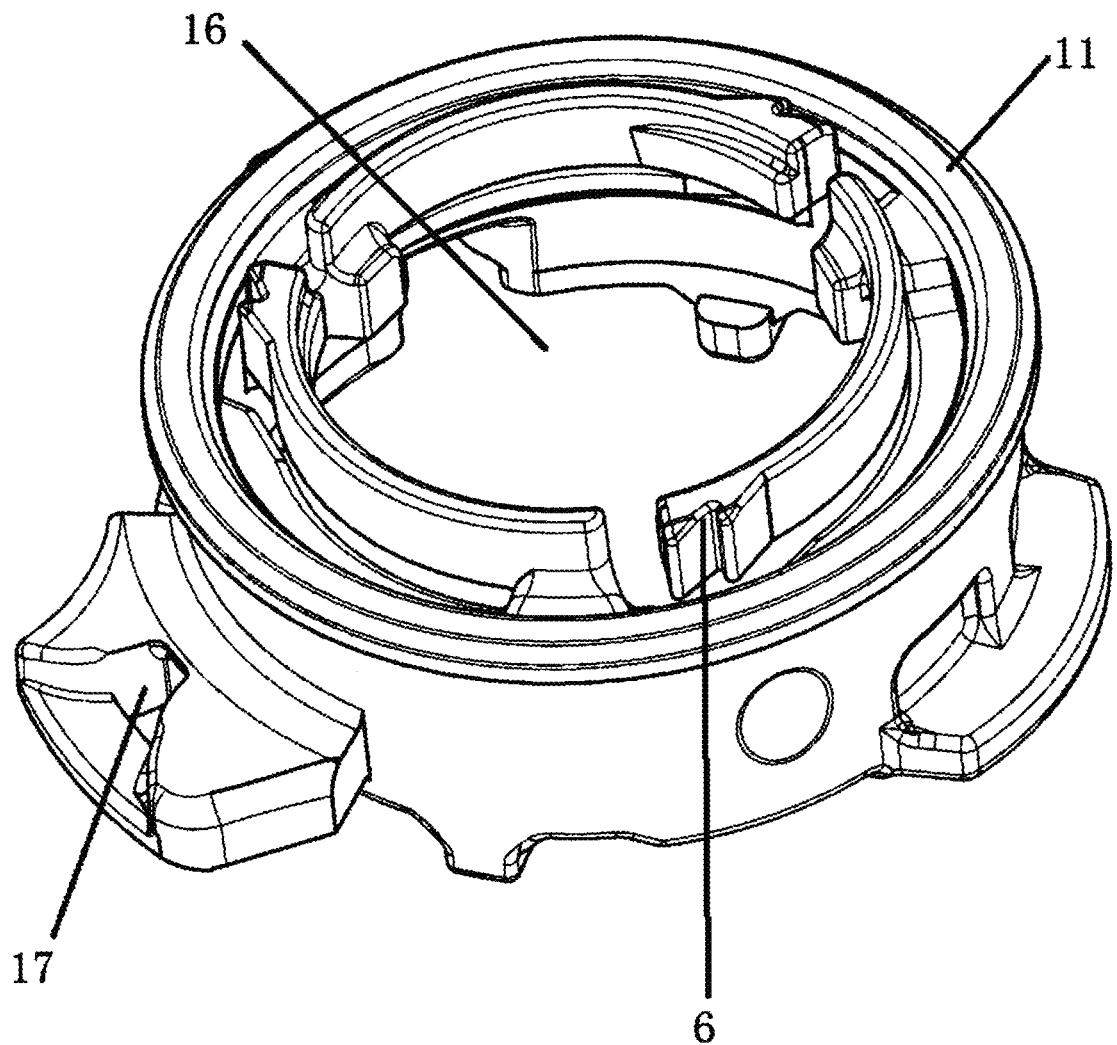
FIG. 5 is a first isometric view of a mounting base in an embodiment of the present disclosure.

As shown in FIG. 5, the mounting base 2 is provided with a rotation restricting portion 6 corresponding to the linkage portion 5 and configured to restrict a rotational direction of the linkage portion 5, wherein the rotational direction of the linkage portion 5 coincides with a direction of tightening the rope of the rope winding part 3.

The rope winding part 3 is rotatably connected to the mounting base 2.

Figure 7:
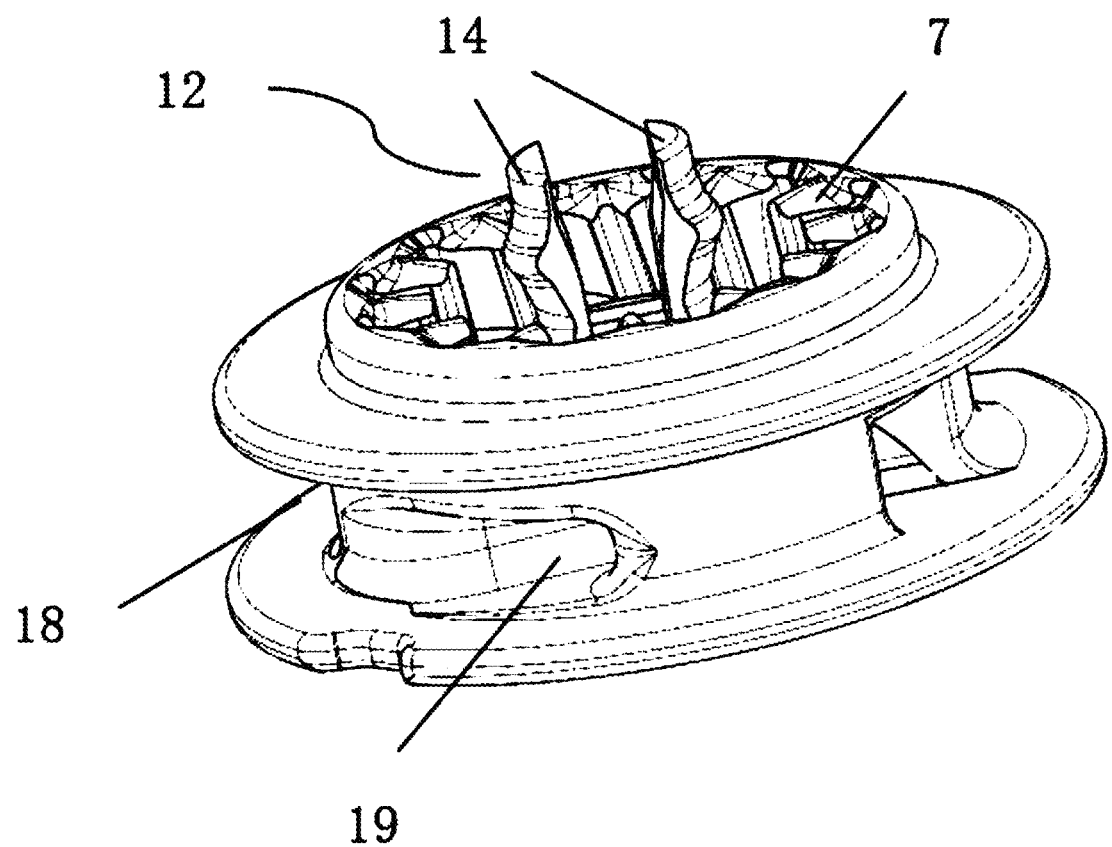
FIG. 7 is a first isometric view of a rope winding part in an embodiment of the present disclosure.

As shown in FIG. 7, the rope winding part 3 is provided with a driven portion 7 in transmission connection with the driving portion 4, and axes of rotation of both the driving portion 4 and the driven portion 7 are collinear.

By rotating the adjusting part 1, a user enables the driving portion 4 on the adjusting part 1 to drive the driven portion 7 on the rope winding part 3, so as to control the rotation of the rope winding part 3, but as the rotation restricting portion 6 restricts the rotational direction of the linkage portion 5, the adjusting part 1 can only rotate towards one direction, thereby the rope can be prevented from becoming loose.

In the present embodiment, the adjusting part 1 further includes a housing 8, wherein the driving portion 4 and the linkage portion 5 are both provided inside the housing 8.

The three, namely, the housing 8, the driving portion 4 and the linkage portion 5, may be integrally molded. Specifically, plastic may be selected as a raw material, and the housing 8, the driving portion 4 and the linkage portion 5 are integrally molded by an injection molding process. In other specific embodiments, a process such as die casting may also be used.

Figure 4:
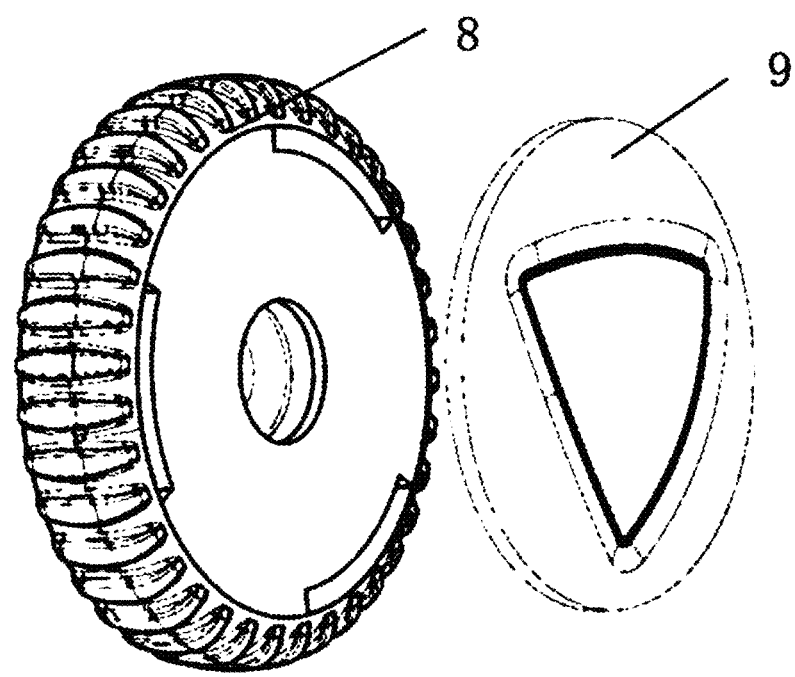
FIG. 4 is a schematic exploded view of a housing and a housing cover in an embodiment of the present disclosure.

As shown in FIG. 4, a housing cover 9 may be provided on the top of the housing 8, wherein the housing cover 9 functions to protect and decorate the housing 8, and the housing cover 9 and the housing 8 may be connected in a clamping manner, and may also be integrally molded.

In the present embodiment, the adjusting part 1 and the mounting base 2 are rotatably connected. Specifically, on the housing 8, an inner wall of an inner bore configured to arrange the driving portion 4 and the linkage portion 5 may be provided with a plurality of buckles 10 in a manner of annular array with respect to an axial line of the driving portion 4, and correspondingly, the mounting base 2 may be provided with a brim (or convex edge) 11 corresponding to the buckles 10. When fastening the buckles 10 to the brim 11, the relative movement between the adjusting part 1 and the mounting base 2 is restricted by the action of the buckles 10 and the brim 11, so that the adjusting part 1 and the mounting base 2 can only rotate relative to each other, without occurrence of disengagement.

In the present embodiment, an outer gear ring may be selected as the driving portion 4, an inner ratchet ring may be selected as the linkage portion 5, an inner gear ring may be selected as the driven portion 7, and a pawl may be selected as the rotation restricting portion 6.

Specifically, a plurality of pawls may be provided and distributed in a manner of annular array about an axis of rotation of the rotation restricting portion 6. By increasing the number of pawls, the restricting effect of the pawls on the inner ratchet ring can be improved and enhanced, and meanwhile, the force can be distributed on the respective pawls, thereby preventing a single pawl from breaking due to uneven force.

The outer gear ring is meshed with the inner gear ring, so as to realize transmission connection therebetween; the inner ratchet ring cooperates with the pawls, and the steering of the inner ratchet ring can be controlled by the pawls, so that the inner ratchet ring can only rotate towards a single direction, thereby also restricting the rotational direction of the adjusting part 1. Meanwhile, due to the restriction of the pawls, as long as the pawls abut against the inner ratchet ring, the adjusting part 1 cannot rotate reversely to loosen the rope.

In the present embodiment, the radius of addendum circle of the outer gear ring is smaller than the radius of addendum circle of the inner ratchet ring.

In the above, in other specific embodiments, an inner gear ring may be chosen as the driving portion 4, and an outer gear ring corresponding thereto may be chosen as the driven portion 7.

As shown in FIG. 3 and FIG. 7, in order to mount both the rope winding part 3 and the adjusting part 1, the rope winding part 3 may be provided with an insertion part 12 located on an axis of rotation of the driven portion 7, and the adjusting part 1 is provided with an insertion hole 13 configured to enable the insertion part 12 to be mounted, wherein the insertion part 12 and the driven portion 7 are both located at a front side of the rope winding part 3. In the above, the insertion hole 13 may be provided on an axial line of the driving portion 4.

The insertion part 12 is inserted into and slidably connected to the insertion hole 13, and meanwhile, the insertion part 12 is further rotatably connected to the insertion hole 13 all the time.

In the above, the linkage portion 5 is combined with or separated from the rotation restricting portion 6 through relative sliding between the insertion part 12 and the insertion hole 13, that is, realizing combination and separation between the inner ratchet ring and pawls in the present embodiment. When the linkage portion 5 is combined with the rotation restricting portion 6, the adjusting part 1 can only rotate towards a single direction; when the linkage portion 5 is separated from the rotation restricting portion 6, as being free of restriction of the rotation restricting portion 6, the adjusting part 1 can rotate in two directions, meanwhile, the rope is in a free state, and can be elongated or shortened freely with the rotation of the rope winding part 3, so that the tightness degree of the rope can be adjusted more conveniently.

In the present embodiment, the insertion part 12 may include several elastic plugs 14, wherein the plug 14 are provided with a metal spring sheet 15 configured to improve the strength. Specifically, two plugs 14 may be provided, and the metal spring sheet 15 may be mounted between the two plugs.

Sliding and rotating actions need to be performed for inserting the plugs 14 into the insertion hole 13, so that damage, breakage and other situations easily occur, while by mounting the metal spring sheet 15 between the two plugs 14, the strength and the service life of the insertion part 12 can be effectively improved.

Figure 9:
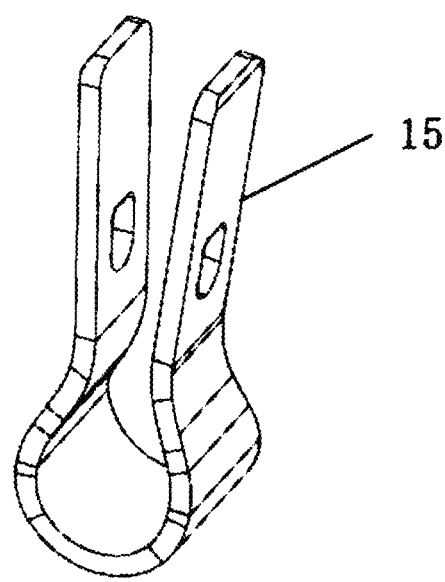
FIG. 9 is a schematic view of a metal spring sheet in an embodiment of the present disclosure.

As shown in FIG. 9, the metal spring sheet 15 may be arranged in 2 shape. In the above, the metal spring sheet 15 may be mounted on the plugs 14 in a clamping or screwing manner.

During use, the linkage portion 5 needs to be combined with the rotation restricting portion 6 most of the time, so as to control the tightness degree of the rope, and only when the rope needs to be loosened, the linkage portion 5 needs to be separated from the rotation restricting portion 6. In order to prevent the linkage portion 5 from being separated from the rotation restricting portion 6 to loose the rope due to vibration, swinging or other situation, a protrusions may be provided on an outer wall of the plugs 14, and correspondingly, limiting grooves corresponding to the protrusions are provided in the insertion hole 13, then relative sliding between the insertion part 12 and the insertion hole 13 is prevented through cooperation between the protrusion and the limiting groove.

When the protrusion is located in the limiting groove, the linkage portion 5 and the rotation restricting portion 6 are in a combined state. When the adjusting part 1 is pulled with an external force and the protrusion is slid out of the limiting groove, the linkage portion 5 and the rotation restricting portion 6 will be separated from each other; thereafter, when the linkage portion 5 and the rotation restricting portion 6 need to be combined again, it is only necessary to press the housing cover 9 of the adjusting part 1 to make the protrusion to slide into the limiting groove.

Figure 6:
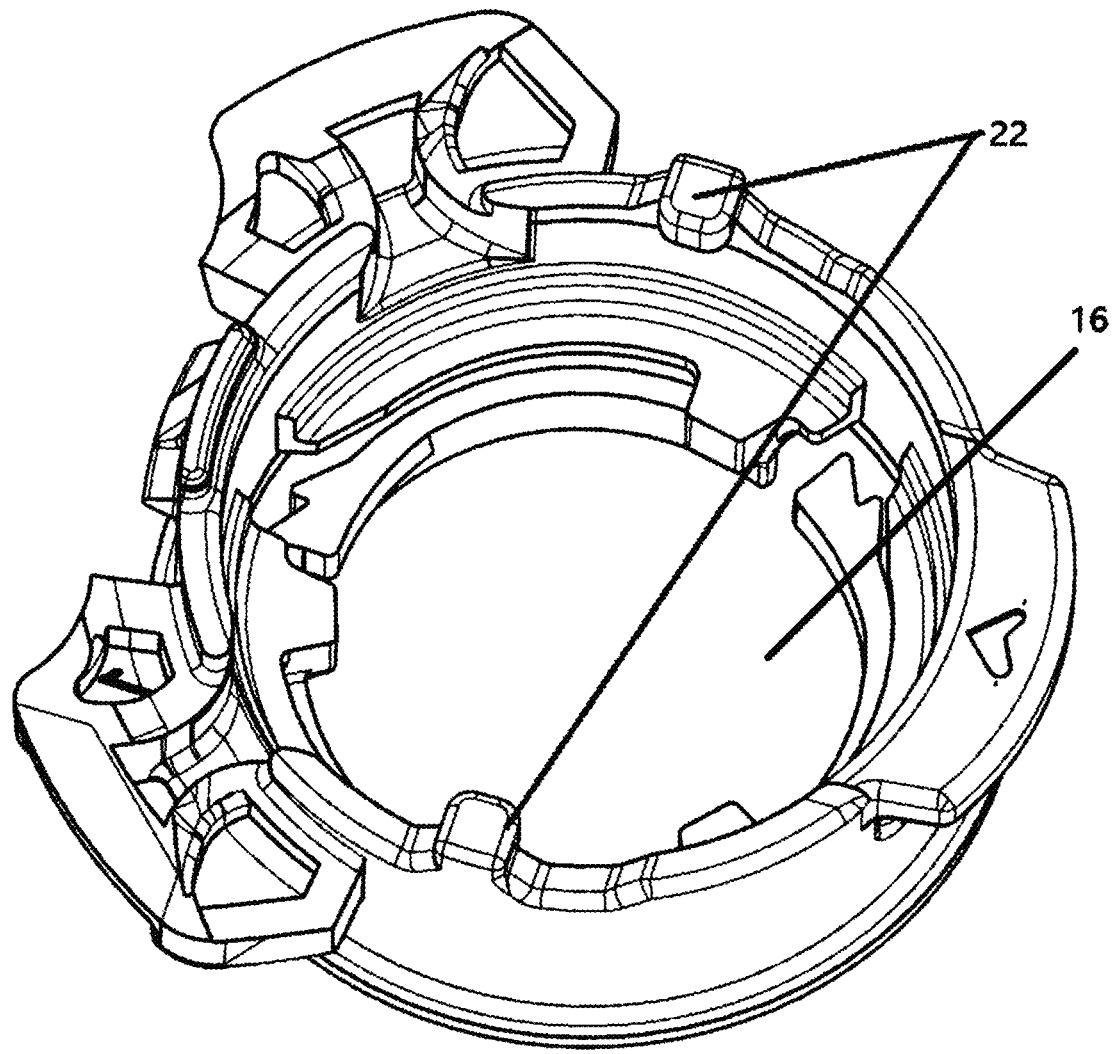
FIG. 6 is a second isometric view of the mounting base in an embodiment of the present disclosure.

The rope winding part 3 is rotated to make the rope to wind thereon, so as to control the length of the rope. As shown in FIG. 5 and FIG. 6, the mounting base 2 may be provided with a mounting hole 16 configured to enable the rope winding part 3 to be mounted, wherein the rope winding part 3 is inserted into and rotatably connected with the mounting hole 16.

Figure 8:
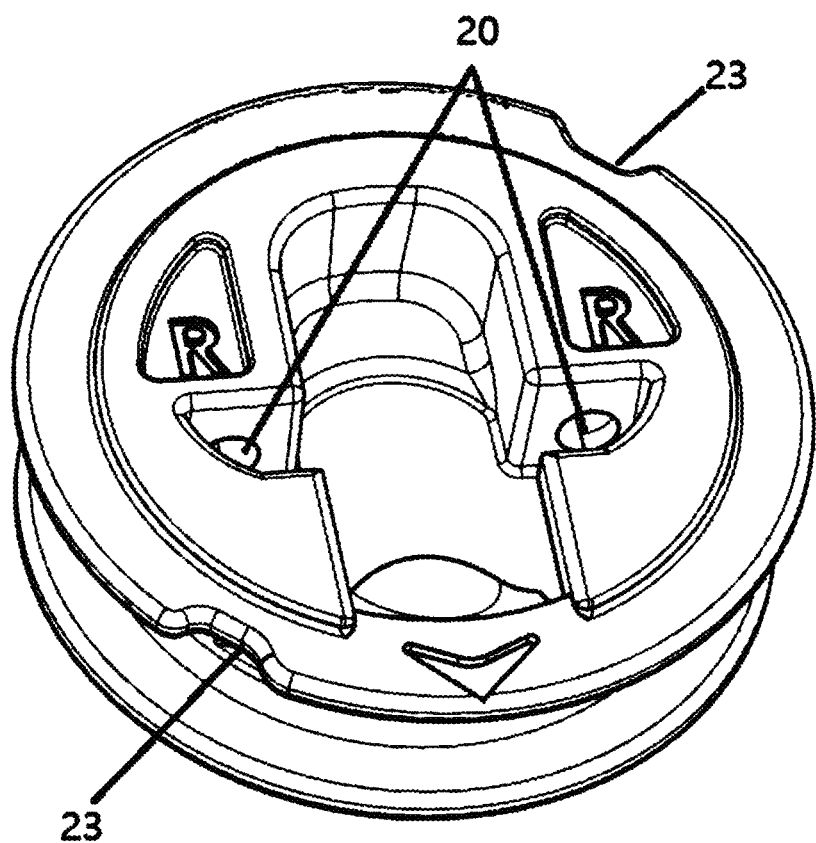
FIG. 8 is a second isometric view of the rope winding part in an embodiment of the present disclosure.

Referring to FIG. 6 and FIG. 8, in order to prevent the rope winding part 3 from being disengaged from the mounting hole 16, limiting buckles 22 may be provided on the mounting base 2. After the rope winding part 3 is inserted into the mounting hole 16 to complete the mounting, when the rope winding part 3 tends to be disengaged from the mounting hole 16, the limiting buckles 22 will press against the back surface of the rope winding part 3, so as to restrict the movement range of the rope winding part 3 and prevent the rope winding part from escaping from the mounting hole 16.

Due to the existence of the limiting buckles 22, the limiting buckles 22 affect the installation and disassembly of the rope winding part 3 to a certain extent. As shown in FIG. 8, in order to facilitate the installation and disassembly of the rope winding part 3, the rope winding part 3 may be provided with disassembling grooves 23 corresponding to the limiting buckles 22 one by one, and the disassembling grooves 23 are configured to make respective limiting buckles 22 to pass therethrough. When the limiting buckles 22 are aligned with the disassembling grooves 23, the winding rope part 3 can be inserted into or taken out of the mounting hole 16.

When mounting the three, namely, the adjusting part 1, the mounting base 2 and the rope winding part 3, the adjusting part 1 may be first connected to the mounting base 2, and then the rope winding part 3 is placed in the mounting hole 16, and the insertion part 12 is inserted into the insertion hole 13.

In order to facilitate the mounting of the rope on the rope adjusting device, a side wall of the mounting base 2 may be provided with several rope inlet holes 17 in communication with the mounting hole 16. In the above, in the present embodiment, the number of the rope inlet holes 17 may be set to two or three and so on.

As shown in FIG. 7, in the present embodiment, a side wall of the rope winding part 3 is provided with a wiring groove 18 configured to be wound by rope, wherein the wiring groove 18 is provided therein with rope threading holes (holes for passing rope therethrough) 19 corresponding to the rope inlet holes 17 one by one, and meanwhile, the rope threading holes 19 are communicated with the mounting hole 16.

After passing through the rope inlet hole 17 and the mounting hole 16 in sequence, a front end of the rope may pass through the rope threading hole 19, and then the front end of the rope is fixed, and then the adjusting part 1 is rotated, and the rope winding part 3 is rotated under the action of the driving portion 4 and the driven portion 7, so as to enable the rope to be wound in the wiring groove 18.

As shown in FIG. 8, in order to facilitate fixing the front end of the rope, exit holes 20 communicated with the rope threading holes 19 may be provided inside the rope winding part 3, and meanwhile, a knotting hole communicated with the exit holes 20 may be provided in the middle of the back surface of the rope winding part 3. The front end of the rope extends through the exit hole 20 and comes out from the knotting hole, and then the front end of the rope is knotted, wherein the diameter at the knotting point should be greater than the diameter of the exit holes 20, so that the movement range of the front end of the rope can be limited and the rope will not slide out from the rope threading holes 19, in this way, the fixing work on the front end of the rope can be completed. If the rope needs to be replaced and adjusted, it only needs to unknot the knot at the front end of the rope, thus the operation is simple and convenient.

In the above, the mounting base 2 and the rope winding part 3 may be provided with a mark for alignment, for example, an arrow, and when the arrows on both the mounting base 2 and the rope winding part 3 are aligned, the rope inlet holes 17 on the mounting base 2 will be aligned with the rope threading holes 19 on the rope winding part 3 one by one, thus facilitating the penetration of the rope.

Figure 10:
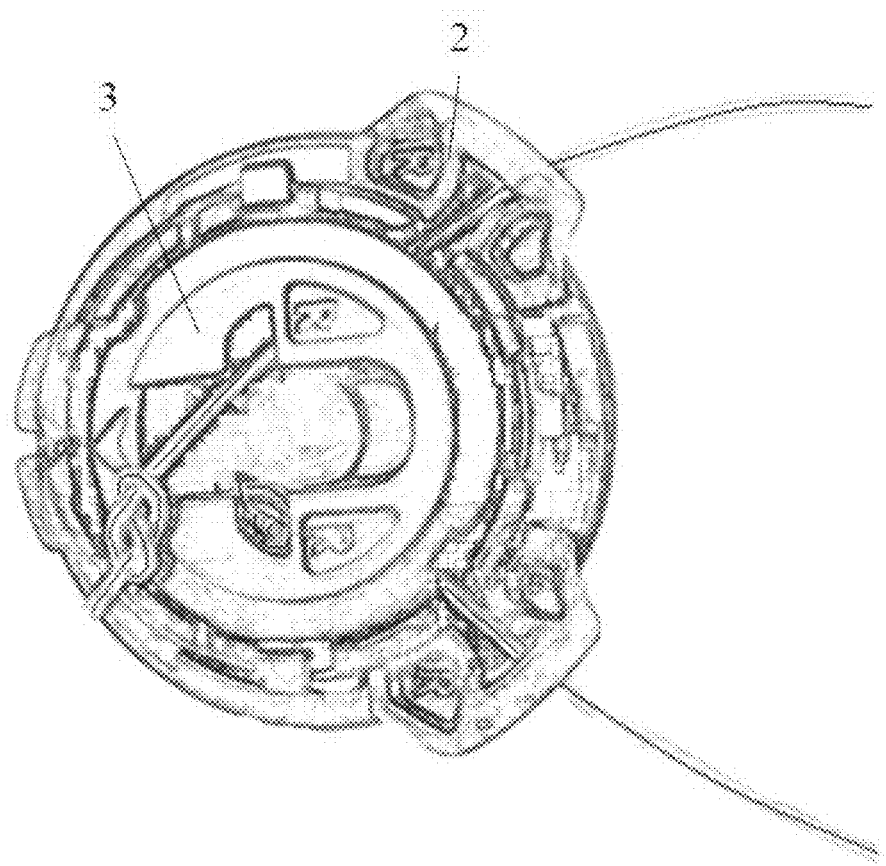
FIG. 10 is a schematic view of rope threading and knotting with the mounting base and the rope winding part in an embodiment of the present disclosure.

As shown in FIG. 10, after the rope winding part 3 is mounted in the mounting base 2, the rope is penetrated and knotted, so as to complete the fixing work on the front end of the rope.

In the present embodiment, the rope adjusting device has a simple structure, and fewer components, and is easily disassembled and assembled, and meanwhile, the tightness degree of the rope can be adjusted by one hand, thus the operation is fast and simple.

In other specific embodiments, the rope adjusting device may be provided with a small motor, and the adjusting part 1 may be driven by the motor to rotate. In the above, a driver of the motor may be provided with a wireless communication module, for example, a Bluetooth module and a wifi module, and the user may adjust the tightness degree of shoelace more easily by using a terminal such as cellphone.

In the present embodiment, the rope adjusting device may further include a sewing part 21, wherein the sewing part 21 may be mounted on the mounting base 2, and then the sewing part 21 may be fixed with suture to an article that needs to use the rope adjusting device; and the rope on the rope adjusting device penetrates into a guiding part mounted in a position such as shoe upper. The adjusting part 1 is adjusted so as to control the telescopic length of the rope, and the guiding part is pulled by the rope, so as to achieve the purpose of adjusting the tightness.

In the present embodiment, an article having the rope adjusting device is further provided, including the above rope adjusting device. Specifically, the rope adjusting device may be applied to articles such as shoes, clothes and medical protective gear.

Those skilled in the art could understand that the accompanying drawings are merely schematic views of a preferred implementation scenario, and modules or flows in the accompanying drawings are not necessarily required for implementing the present disclosure.

Those skilled in the art could understand that the modules in the device in the implementation scenario can be distributed in the device in the implementation scenario according to the description of the implementation scenario, and also can be correspondingly changed and located in one or more devices different from that in the present implementation scenario. The modules in the above implementation scenario may be combined into one module, and also may be further split into a plurality of sub-modules.

The sequence numbers of the above embodiments are merely for the descriptive purpose, but do not represent advantages and disadvantages of the implementation scenarios.

The above-disclosed are merely several specific implementation scenarios of the present disclosure, but the present disclosure is not limited thereto, and any changes that can occur to those skilled in the art should fall within the scope of protection of the present disclosure.

What is claimed is:

1. A rope adjusting device, comprising an adjusting part, a mounting base and a rope winding part configured to wind a rope,
   wherein the adjusting part and the mounting base are rotatably connected to each other, the adjusting part comprises a driving portion and a linkage portion, which are relatively fixed and coaxially arranged;
   the mounting base is provided with a rotation restricting portion, which is corresponding to the linkage portion and configured to restrict a rotational direction of the linkage portion, wherein the rotational direction of the linkage portion coincides with a direction of tightening the rope of the rope winding part;
   the rope winding part is rotatably connected to the mounting base, the rope winding part is provided with a driven portion in transmission connection with the driving portion, and axes of rotation of both the driving portion and the driven portion are collinear;
   the mounting base is further provided with limiting buckles, after the rope winding part is inserted into a mounting hole to complete the mounting, when the rope winding part tends to be disengaged from the mounting hole, the limiting buckles press against a back surface of the rope winding part, so as to restrict a movement range of the rope winding part and prevent the rope winding part from escaping from the mounting hole; and
   the rope winding part is further provided with disassembling grooves corresponding to the limiting buckles one by one, and the disassembling grooves are configured to make respective limiting buckles to pass therethrough, and when the limiting buckles are aligned with the disassembling grooves, the winding rope part is inserted into or taken out of the mounting hole.

2. The rope adjusting device according to claim 1, wherein the adjusting part further comprises a housing, wherein the driving portion and the linkage portion are both provided inside the housing.

3. The rope adjusting device according to claim 2, wherein the housing, the driving portion and the linkage portion are integrally molded.

4. The rope adjusting device according to claim 1, wherein the driving portion comprises an outer gear ring, the linkage portion comprises an inner ratchet ring, the driven portion comprises an inner gear ring, and the rotation restricting portion comprises at least one pawl; and
   a radius of an addendum circle of the outer gear ring is smaller than a radius of an addendum circle of the inner ratchet ring.

5. The rope adjusting device according to claim 1, wherein the rope winding part is provided with an insertion part located on an axis of rotation of the driven portion, and the adjusting part is provided with an insertion hole configured to enable the insertion part to be mounted, wherein the insertion part and the driven portion are both located at a front side of the rope winding part; and
   the insertion part is inserted into and slidably connected to the insertion hole, and meanwhile, the insertion part is further rotatably connected to the insertion hole all the time,
   wherein the linkage portion is combined with or separated from the rotation restricting portion through relative sliding between the insertion part and the insertion hole.

6. The rope adjusting device according to claim 5, wherein the insertion part comprises several elastic plugs, wherein the plugs are provided with a metal spring sheet configured to improve strength.

7. The rope adjusting device according to claim 1, wherein the mounting base is provided with a mounting hole configured to enable the rope winding part to be mounted, and the rope winding part is inserted into and rotatably connected with the mounting hole; and
   the mounting base is further provided with at least one limiting buckle, and the at least one limiting buckle is configured to limit a movement range of the rope winding part and prevent the rope winding part from escaping from the mounting hole.

8. The rope adjusting device according to claim 7, wherein a side wall of the mounting base is provided with several rope inlet holes in communication with the mounting hole;
   a side wall of the rope winding part is provided with a wiring groove configured to wind the rope, wherein the wiring groove is provided therein with rope threading holes corresponding to the rope inlet holes one by one; and
   the rope threading holes are in communication with the mounting hole.

9. The rope adjusting device according to claim 8, wherein exit holes in communication with the rope threading holes are provided inside the rope winding part, wherein a front end of the rope extends from one of the exit holes and is knotted, so as to restrict a movement range of the front end of the rope, so that the rope will not slide out from the rope threading holes.

10. An article having the rope adjusting device, comprising the rope adjusting device according to claim 1.

11. The article having the rope adjusting device according to claim 10, wherein the adjusting part further comprises a housing,
    wherein the driving portion and the linkage portion are both provided inside the housing.

12. The article having the rope adjusting device according to claim 11, wherein the housing, the driving portion and the linkage portion are integrally molded.

13. The article having the rope adjusting device according to claim 10, wherein the driving portion comprises an outer gear ring, the linkage portion comprises an inner ratchet ring, the driven portion comprises an inner gear ring, and the rotation restricting portion comprises at least one pawl; and
- a radius of an addendum circle of the outer gear ring is smaller than a radius of an addendum circle of the inner ratchet ring.

14. The article having the rope adjusting device according to claim 10, wherein the rope winding part is provided with an insertion part located on an axis of rotation of the driven portion, and the adjusting part is provided with an insertion hole configured to enable the insertion part to be mounted, wherein the insertion part and the driven portion are both located at a front side of the rope winding part; and
- the insertion part is inserted into and slidably connected to the insertion hole, and meanwhile, the insertion part is further rotatably connected to the insertion hole all the time,
- wherein the linkage portion is combined with or separated from the rotation restricting portion through relative sliding between the insertion part and the insertion hole.

15. The article having the rope adjusting device according to claim 14, wherein the insertion part comprises several elastic plugs, wherein the plugs are provided with a metal spring sheet configured to improve strength.

16. The article having the rope adjusting device according to claim 10, wherein the mounting base is provided with a mounting hole configured to enable the rope winding part to be mounted, and the rope winding part is inserted into and rotatably connected with the mounting hole; and
- the mounting base is further provided with at least one limiting buckle, and the at least one limiting buckle is configured to limit a movement range of the rope winding part and prevent the rope winding part from escaping from the mounting hole.

17. The article having the rope adjusting device according to claim 16, wherein a side wall of the mounting base is provided with several rope inlet holes in communication with the mounting hole;
- a side wall of the rope winding part is provided with a wiring groove configured to wind the rope, wherein the wiring groove is provided therein with rope threading holes corresponding to the rope inlet holes one by one; and
- the rope threading holes are in communication with the mounting hole.

18. The article having the rope adjusting device according to claim 17, wherein exit holes in communication with the rope threading holes are provided inside the rope winding part, wherein a front end of the rope extends from one of the exit holes and is knotted, so as to restrict a movement range of the front end of the rope, so that the rope will not slide out from the rope threading holes.

\* \* \* \* \*